(12) United States Patent
Mitsuyama et al.

(10) Patent No.: US 12,174,360 B2
(45) Date of Patent: Dec. 24, 2024

(54) IMAGING MECHANISM AND SAMPLE ANALYZING APPARATUS PROVIDED WITH THE SAME

(71) Applicant: Hitachi High-Tech Corporation, Tokyo (JP)

(72) Inventors: Toshifumi Mitsuyama, Tokyo (JP); Akira Doi, Tokyo (JP); Hitoshi Miyata, Tokyo (JP); Tomohiro Shoji, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 560 days.

(21) Appl. No.: 17/619,624

(22) PCT Filed: Jul. 18, 2019

(86) PCT No.: PCT/JP2019/028208
§ 371 (c)(1),
(2) Date: Dec. 16, 2021

(87) PCT Pub. No.: WO2021/009892
PCT Pub. Date: Jan. 21, 2021

(65) Prior Publication Data
US 2022/0350124 A1    Nov. 3, 2022

(51) Int. Cl.
*G02B 21/26* (2006.01)
*G02B 21/16* (2006.01)
(Continued)

(52) U.S. Cl.
CPC ............. *G02B 21/26* (2013.01); *G02B 21/16* (2013.01); *G02B 21/28* (2013.01); *G02B 21/30* (2013.01); *G02B 21/36* (2013.01); *B01L 7/52* (2013.01)

(58) Field of Classification Search
None
See application file for complete search history.

(56) References Cited

U.S. PATENT DOCUMENTS 7,081,600 B2    7/2006   Brown
2015/0308931 A1  10/2015  Toogood et al.

FOREIGN PATENT DOCUMENTS

JP    2006-090749 A    4/2006
JP    2011-234681 A    11/2011
(Continued)

OTHER PUBLICATIONS

International Search Report of PCT/JP2019/028208 dated Sep. 3, 2019.
(Continued)

*Primary Examiner* — Derek S. Chapel
(74) *Attorney, Agent, or Firm* — MATTINGLY & MALUR, PC

(57) ABSTRACT

An image capturing mechanism includes: an optical measurement unit for optically observing a sample; a temperature conditioning unit for heating or cooling the sample, the temperature conditioning unit being mounted on a table by means of a support member; and a moving mechanism for moving the table in order to photograph the sample. The temperature conditioning unit includes: a temperature conditioning part for heating or cooling the sample, abutted on one face of a Peltier device; a heat conducting member abutted on the other face of the Peltier device; and the support member for holding the temperature conditioning part and the heat conducting member and securing the temperature conditioning part and the heat conducting member on the table. At least the heat conducting member is connected to a cooling means, and the thermal conductivity (Continued)

of the support member is low relative to the thermal conductivity of the heat conducting member.

6 Claims, 8 Drawing Sheets

(51) Int. Cl.
*G02B 21/28* (2006.01)
*G02B 21/30* (2006.01)
*G02B 21/36* (2006.01)
*B01L 7/00* (2006.01)

(56) References Cited

FOREIGN PATENT DOCUMENTS

| | | |
|---|---|---|
| JP | 2015-090458 A | 5/2015 |
| JP | 2017-183533 A | 10/2017 |

OTHER PUBLICATIONS

International Preliminary Report on Patentability dated Dec. 10, 2019, for PCT/JP2019/028208.

IMAGING MECHANISM AND SAMPLE ANALYZING APPARATUS PROVIDED WITH THE SAME

TECHNICAL FIELD

The present invention relates to an imaging mechanism and a sample analyzing apparatus including the imaging mechanism, and more particularly to an imaging mechanism suitable for analyzing a biological substance such as DNA and a sample analyzing apparatus including the imaging mechanism.

BACKGROUND ART

In recent years, new techniques for determining base sequences of DNA and RNA have been developed. A method has been proposed in which a large number of DNA fragments to be analyzed are fixed to a substrate, and the base sequences of the large number of DNA fragments are determined in parallel. An apparatus that determines the base sequences of DNA by such a method is called a next generation sequencer.

Next generation DNA sequencers are based on wide-field fluorescence microscopy. In order to detect more DNA fragments in which a phosphor is incorporated with high recognition accuracy, it is necessary to acquire a fluorescent image with less image blur and aberration due to focus deviation.

For this fluorescent labeling, a process of putting a dedicated reagent into a DNA fragment as an observation sample and heating the DNA fragment is required. Then, after the fluorescent labeling process is completed, optical measurement (hereinafter, referred to as imaging) is performed. In this imaging, when the distance between imaging means and the observation sample does not fall within a predetermined range, a focus deviation occurs, and a problem such as image blur or aberration of a fluorescent image increases occurs.

In the next generation DNA sequencer, a flow cell is fixedly disposed on an XY stage immediately below an objective lens for imaging. Here, the flow cell is a cell in which a large number of beads having DNA fragments immobilized thereon are arranged and a flow path for allowing a reagent to flow is formed.

Then, by sequentially moving the XY stage by the size of the measurement visual field, a reaction state between the observation sample and the reagent on the flow cell is imaged, and the base sequence information is optically detected.

In the generation DNA sequencer according to the next invention, means for adjusting the temperature of the observation sample, such as heating or cooling, in order to promote the chemical reaction of the reagent is provided on the stage described above. As means for adjusting the temperature, a piezoelectric element is generally used.

As temperature conditioning means incorporated in an apparatus and configured to promote the chemical reaction as described above, for example, a Peltier device is used as disclosed in PTL 1 or PTL 2.

CITATION LIST

Patent Literature

PTL 1: U.S. Pat. No. 7,081,600
PTL 2: JP 2006-090749 A

SUMMARY OF INVENTION

Technical Problem

In the above-described apparatus, a temperature difference is generated on both surfaces of the Peltier device by applying a current to the Peltier device. A plate-shaped temperature conditioning member is attached to one face (referred to as a temperature conditioning face), and a measurement sample is mounted in contact with the temperature conditioning member. Then, a predetermined temperature can be applied to the measurement sample by controlling the applied current of the Peltier device while measuring the temperature by temperature measuring means such as a thermistor incorporated in the temperature conditioning member.

On the other hand, heat absorption occurs when the temperature conditioning face is heated and heat generation occurs when the temperature conditioning face is cooled on a surface (referred to as a heat dissipating face) opposite to the temperature conditioning face. In particular, at the time of heat generation, if heat dissipation is insufficient, the element itself may be damaged, or the temperature of the Peltier device mounting surface may rise, and thermal deformation of the mounting member may occur.

Therefore, generally, a member having a large heat capacity such as a heat sink is attached to the heat dissipating face side of the Peltier device, and means for cooling the member is provided.

However, even when the cooling means is provided, a certain time is required for cooling. If a sufficient cooling time is not secured, a structure supporting the observation sample is thermally deformed due to thermal deformation due to a temperature change of the apparatus, and a distance between the imaging means and the observation sample changes during the imaging, so that a focus deviation occurs, and a problem such as image blur and aberration of a fluorescent image increase occurs.

On the other hand, when a sufficient cooling time is secured, it is necessary to take a long time to start imaging, and thus there is a problem that the apparatus throughput is significantly reduced.

In the present invention from the above, an object of the invention is to provide an imaging mechanism that is suitable for hindering heat generated on a heat dissipating face of a Peltier device during imaging from being conveyed to a support member holding a sample, as well as a sample analyzing apparatus provided with the imaging mechanism.

Solution to Problem

As described above, according to the present invention, there are provided an imaging mechanism provided with: an optical measurement unit for optically observing a sample; a temperature conditioning unit for heating or cooling the sample, the temperature conditioning unit being mounted on a table by means of a support member; and a moving mechanism for moving the table in order to photograph an entire region of the sample, wherein the temperature conditioning unit is provided with a temperature conditioning part for heating or cooling the sample, abutted on one face of a Peltier device; a heat conducting member abutted on an other face of the Peltier device; and a support member for holding the temperature conditioning part and the heat conducting member and fixing the temperature conditioning part and the heat conducting member on the table, and wherein at least the heat conducting member is connected to cooling means, and thermal conductivity of the support member is low relative to thermal conductivity of the heat conducting member, and a sample analyzing apparatus using the imaging mechanism.

Advantageous Effects of Invention

According to the present invention, it is possible to make it difficult for heat generated on the heat dissipating face of the Peltier device during imaging to be transferred to the support member that holds the sample, and by suppressing thermal deformation of the support member, it is possible to reduce problems such as occurrence of focus deviation at the time of imaging and increase in image blur and aberration of a fluorescent image. As a result, it is not necessary to secure a long cooling time, and thermal deformation due to a temperature change of the apparatus is suppressed, so that it is possible to realize a high apparatus throughput with higher recognition accuracy.

DESCRIPTION OF EMBODIMENTS

Hereinafter, embodiments of the present invention will be described with reference to the drawings. Note that, although the drawings illustrate specific embodiments conforming to the principles of the present invention, these are for understanding the present invention and are not used to interpret the present invention in a limited manner.

First Embodiment

Figure 1:
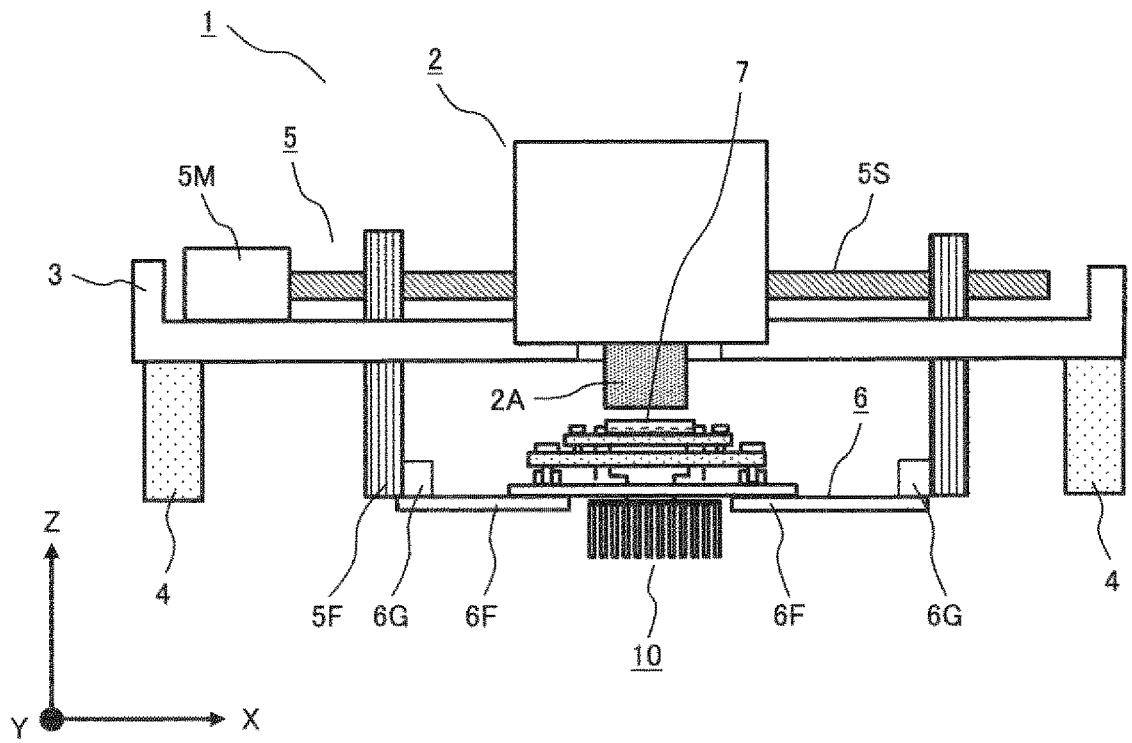
FIG. 1 is a diagram illustrating an appearance of an imaging mechanism 1 in a sample analyzing apparatus according to an embodiment of the present invention.

FIG. 1 is an appearance of an imaging mechanism 1 in a sample analyzing apparatus according to an embodiment of the present invention.

An imaging mechanism 1 includes an optical measurement unit 2 for optically observing a sample 7, a temperature conditioning unit 10 being mounted on a table 6F, and for heating and cooling the sample for a fluorescent labeling reaction of the sample 7, an X moving mechanism 5 for sequentially moving the table 6F in order to photograph the entire region of the sample 7, a Y moving mechanism 6, a base frame 3 for supporting them, and a vibration removing member 4 for blocking vibration from the outside.

The X moving mechanism 5 is a mechanism for moving an x frame 5F attached to a linear guide (not illustrated), the Y moving mechanism 6, and the temperature conditioning unit 10 in the X direction in the drawing by a stepping motor 5M and a ball screw 5S.

The Y moving mechanism 6 is a mechanism for moving the table 6F attached to a linear guide 6G and the temperature conditioning unit 10 in the Y direction in the drawing by a stepping motor and a ball screw (not illustrated).

The optical measurement unit 2 includes an imaging element (not illustrated), imaging means 2A such as an objective lens, and the like. Since the imaging range in the present configuration is minute, in order to observe the entire sample 7, it is possible to observe the entire region of the sample 7 by moving the X moving mechanism 5 and the Y moving mechanism 6 by a minute amount and repeating the operation of locally imaging.

Here, the sample 7, called a flow cell, is a cell in which a large number of beads having DNA fragments immobilized thereon are arranged and a flow path for allowing a reagent to flow is formed.

When fluorescent labeling is performed, a reagent is suctioned from a reagent storage (not illustrated) and injected into the sample 7. Then, while the temperature is controlled by the temperature conditioning function, the process waits until the reaction is completed. When a plurality of reaction steps are required, the above-described steps are repeated.

In the imaging mechanism 1, the temperature conditioning unit 10 applies two-stage temperatures to the sample 7. One of them is a temperature for promoting a chemical reaction of the reagent for fluorescent labeling sent to the sample 7. The other is an imaging temperature for achieving a constant temperature condition in order to suppress thermal deformation of the temperature conditioning unit 10 at the time of optical observation by the optical measurement unit 2.

First, the temperature is raised to fluorescently label the material 7 before imaging, and after the time required for the reaction has elapsed, the temperature is lowered to the imaging temperature, and observation is performed.

Figure 2:
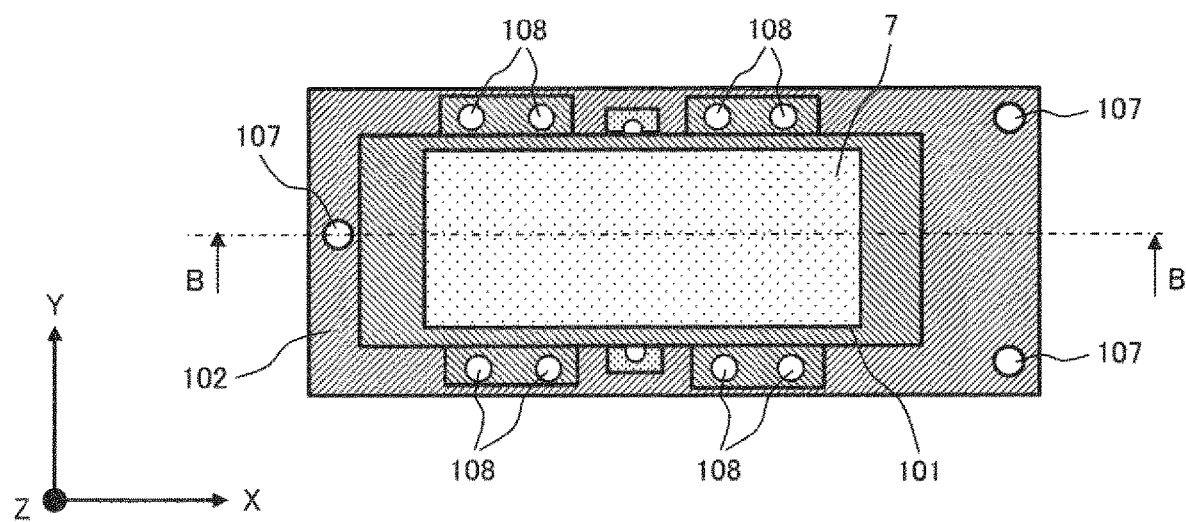
FIG. 2 is a top view of a temperature conditioning unit according to a first embodiment.
Figure 3:
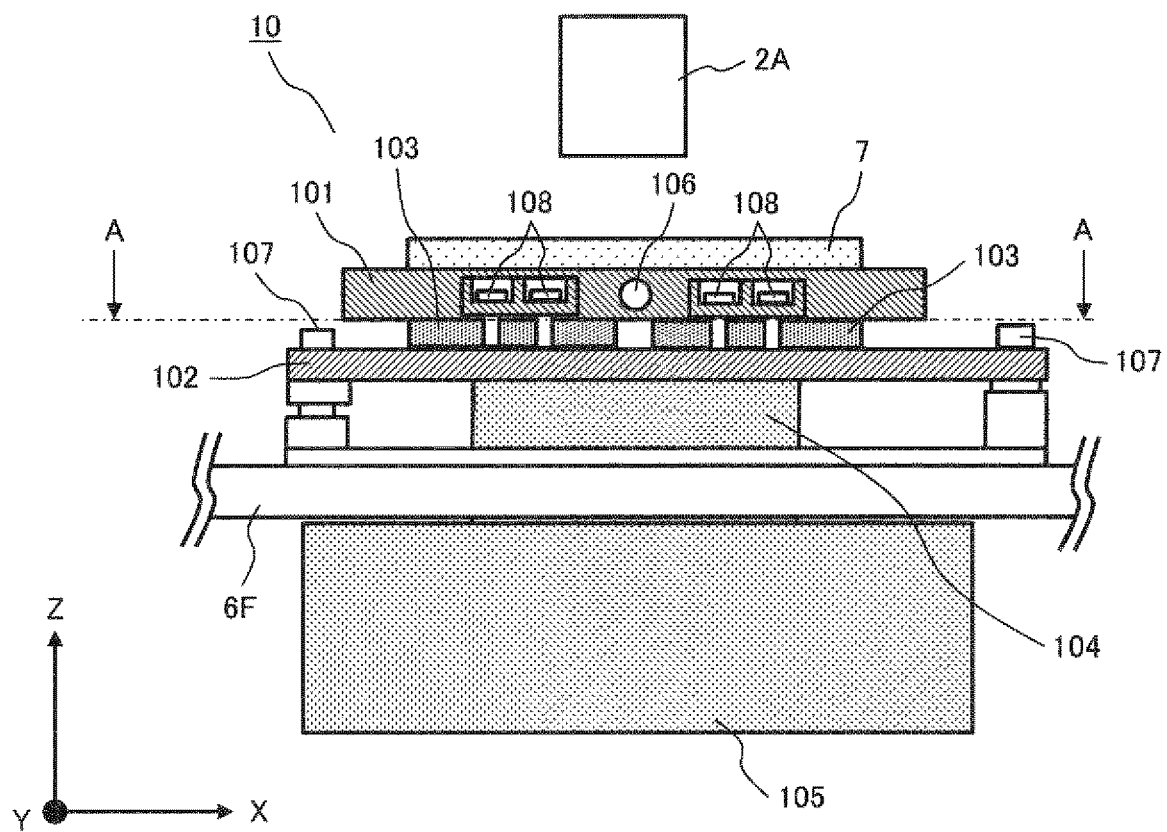
FIG. 3 is a side view of a temperature conditioning unit according to the first embodiment.
Figure 4:
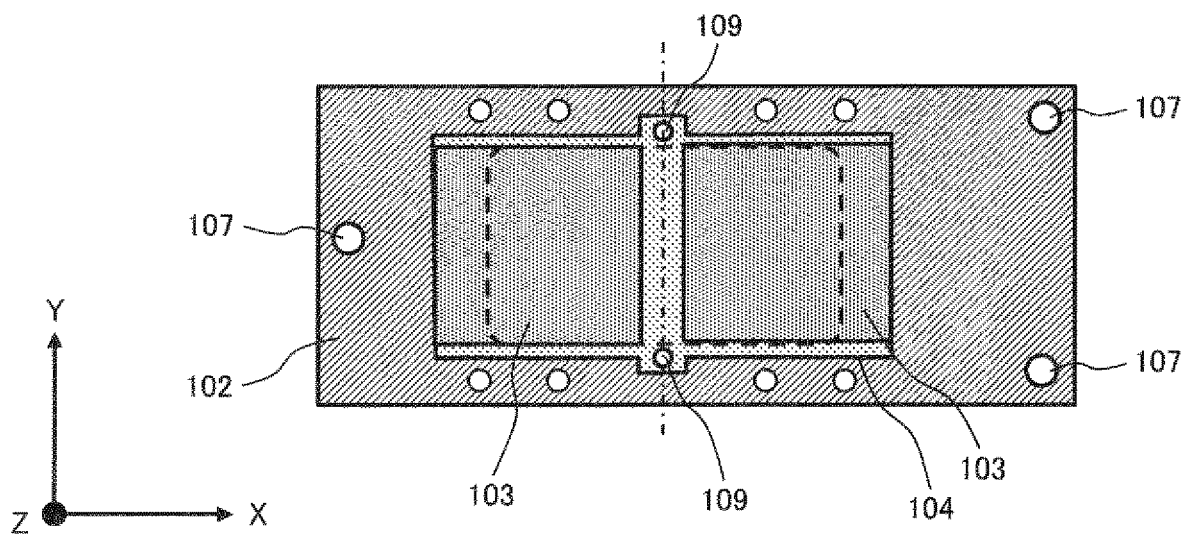
FIG. 4 is a cross-sectional view taken along line A-A of the temperature conditioning unit according to the first embodiment.

Next, a specific configuration of the temperature conditioning unit 10 of FIG. 1 will be described with reference to FIGS. 2 to 5. FIG. 2 is a top view of the temperature conditioning unit 10 according to the first embodiment, and FIG. 3 is a side view thereof. FIG. 4 illustrates a cross section taken along line A-A in FIG. 3, and FIG. 5 illustrates a cross section taken along line B-B in FIG. 2.

Figure 5:
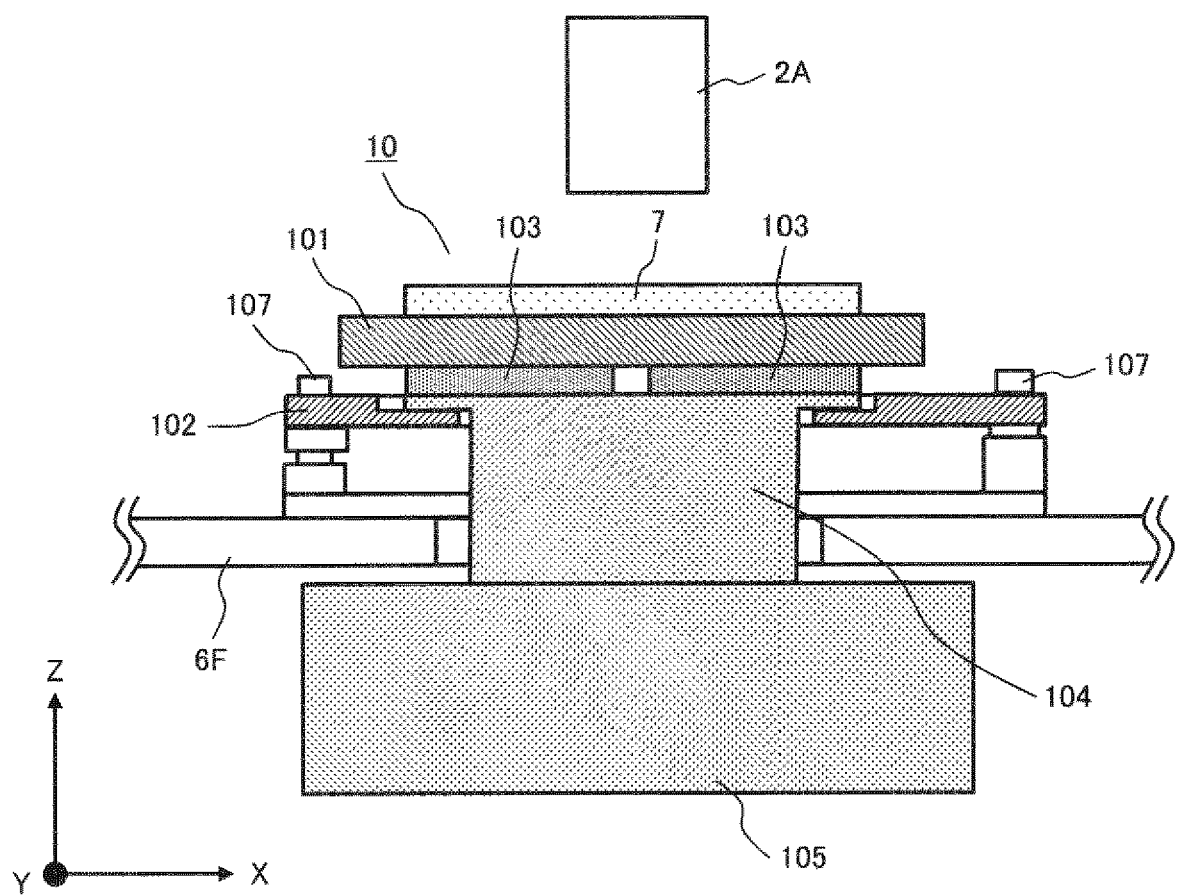
FIG. 5 is a cross-sectional view taken along line B-B of the temperature conditioning unit according to the first embodiment.

As clearly disclosed in FIGS. 3 and 5, the temperature conditioning unit 10 of the first embodiment includes a Peltier device 103 for heating and cooling the sample 7 to be measured. The temperature conditioning member 101 is attached to one face (temperature conditioning face side) of the Peltier device 103, and the sample 7 is fixed to the upper face thereof in a state of being in close contact with the sample 7.

Here, the temperature conditioning member 101 incorporates a thermistor 106 for measuring its own temperature.

The temperature of the temperature conditioning member 101 is measured by the thermistor 106, and the temperature of the Peltier device 103 is controlled by current adjustment means (not illustrated), and thereby a predetermined temperature can be applied to the sample 7.

Further, as is clear from FIG. 5, the heat conducting member 104 is attached so as to come into contact with the lower face (heat dissipating face) side of the Peltier device 103. Further, a heat sink 105 is attached to an end of the heat conducting member 104. The heat sink 105 is cooled by cooling means (not illustrated).

The temperature conditioning unit 10 is provided with a support member 102 that supports the temperature conditioning member 101, the Peltier device 103, and the heat conducting member 104 and adjusts the distance between the imaging means 2A and the sample 7. Here, the support member 102 fixes and supports the Peltier device 103 and the temperature conditioning member 101 by a mounting screw 108.

As described above with reference to the side view of FIG. 3 and the cross-sectional view of FIG. 5, the temperature conditioning unit 10 is disposed facing the imaging means 2A of the optical measurement unit 2. In addition, the temperature conditioning unit 10 is formed by sequentially arranging the sample 7, the temperature conditioning member 101, the Peltier device 103, the support member 102, the heat conducting member 104, and the heat sink 105 from an upper portion to a lower portion.

FIG. 2 specifically illustrates a support structure between the support member 102 and the temperature conditioning member 101, and FIG. 4 specifically illustrates a support structure between the support member 102 and the heat conducting member 104.

According to FIGS. 2 and 4, the support member 102 is attached at three positions so as to be fixed to the table 6F by an adjustment screw 107. A face angle of the support member 102 can be changed by adjusting the attachment heights of the three screws. Then, when the table 6F is moved in the X and Y directions in the drawing at the time of imaging, the measurement position of the sample 7 and the distance D between the imaging means 2A can be adjusted so as to fall within a range in which focus deviation does not occur.

This structure is an imaging mechanism including the optical measurement unit 2 for optically observing the sample 7, the temperature conditioning unit 10 being mounted on the table 6F by the support member 102 and heating and cooling the sample 7 for a fluorescent labeling reaction of the sample 7, and a moving mechanism for moving the table 6F in order to photograph an entire region of the sample 7, in which the temperature conditioning unit 10 is provided with a temperature conditioning part 101 for heating and cooling the sample 7 and abutted on one face of the Peltier device 103, a heat conducting member 104 abutted on the other face of the Peltier device 103, and a support member 102 communicating with the temperature conditioning part 101, and at least the heat conducting member 104 is connected to cooling means (heat sink 105).

In the present invention, the heat conducting member 104 is made of a material having higher thermal conductivity than the support member 102. The support member 102 is made of a material having a linear expansion coefficient lower than that of the heat conducting member 104. Here, an iron-based alloy, for example, a Fe—Ni 36% alloy (thermal conductivity 13 $[Wm^{-1}K^{-1}]$, linear expansion coefficient $1.7\times10^{-6}$ $[K^{-1}]$) is used for the support member 102, and an Al alloy A 6063 (thermal conductivity 220 $[Wm^{-1}K^{-1}]$, linear expansion coefficient $23\times10^{-6}$ $[K^{-1}]$) is used for the heat conducting member.

As a result, in the temperature conditioning unit 10 of the first embodiment, when the temperature conditioning member 101 is cooled, most of the heat generated on the heat dissipation side of the Peltier device 103 is propagated by the heat dissipation member (heat sink 105) via the heat conducting member 104.

As is clear from FIG. 4, heat conducting member 104 is fixed to support member 102 by fixing screws 109 at two positions in the center in the lateral direction (Y direction in the drawing). By being fixed at a central portion, deformation of the heat conducting member 104 in the longitudinal direction (X direction in the drawing) is not hindered by fixing screws 109, and no thermal stress acts on the support member 102.

Further, as is clear from FIGS. 2 and 4, the support member 102 has a through hole larger than the outer shape of the heat conducting member 104 so as not to come into contact with the heat conducting member 104 at the central portion. Furthermore, the heat conducting member 104 has a face that partially contacts in the direction of gravity (Z direction in the drawing) so as to support its own weight, but an area thereof is sufficiently smaller than an area of the face where the heat conducting member 104 comes into contact with the Peltier device 103. In addition, a groove-shaped portion exists in the support member 102, the heat conducting member 104 is disposed in the groove-shaped portion, and a gap is provided between the support member 102 and the heat conducting member 104 in the X direction in the drawing, so that thermal deformation of the heat conducting member 104 is not transferred to the support member 102.

In the temperature conditioning unit 10, two-stage temperatures are applied to the sample 7. One is a temperature for promoting a fluorescent labeling reaction in the sample 7, and here, the temperature is defined as T1. The other is a temperature (hereinafter, the imaging temperature is defined as an imaging temperature) when the temperature conditioning member 101 is kept constant during imaging in order to suppress thermal deformation of a temperature conditioning device 10, and this temperature is defined as T2.

First, before imaging, the temperature conditioning member 102 is heated to the temperature T1 in order to promote the fluorescent labeling reaction by the reagent injected into the sample 7. Then, after the time required for the reaction has elapsed, the temperature conditioning member 101 is lowered to the imaging temperature T2, and then imaging is performed.

Here, the temperature of the temperature conditioning member 101 attached to the temperature conditioning face side of the Peltier device 103 becomes constant by the temperature conditioning of the Peltier device 103.

When the temperature conditioning member 101 is cooled to the imaging temperature T2, the temperature on the heat dissipating face side of the Peltier device 103 increases. The heat generated here is transferred to the heat sink 105 via the heat conducting member 104. Then, the heat sink 105 is cooled by cooling means (for example, a fan) (not illustrated).

Here, a part of the support member 102 is in contact with the heat conducting member 104. However, as described above, since the heat conducting member 104 is made of a material having a higher thermal conductivity than the support member 102, most of the heat generated in the Peltier device 103 is propagated to the heat conducting portion 104.

Therefore, the amount of heat transferred to the support member 102 is reduced, and the temperature change can be reduced, thereby reducing the thermal deformation amount.

In addition, as described above, the support member 102 uses an iron-based alloy having a low linear expansion coefficient, for example, a Fe—Ni 36% alloy (linear expansion coefficient $1.7 \times 10^{-6}$ [$K^{-1}$]), and the amount of thermal deformation is smaller than that in the configuration in the related art.

Figure 6:
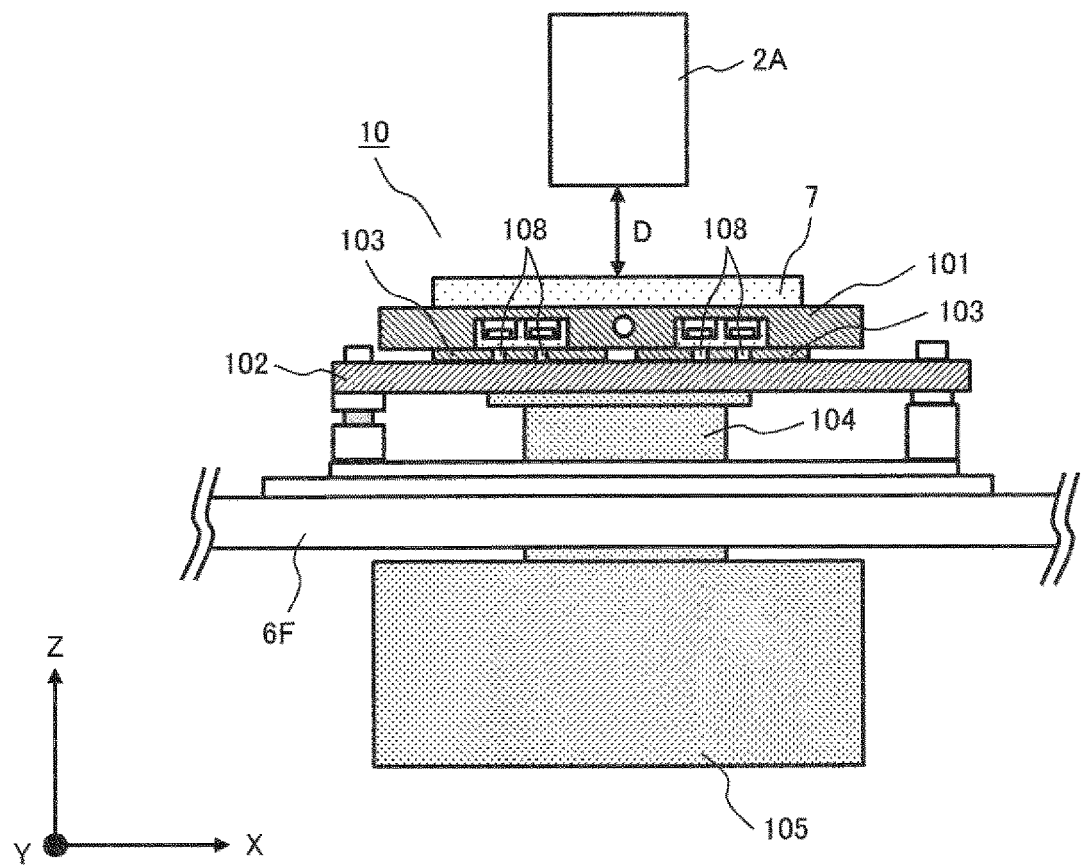
FIG. 6 is a diagram illustrating an appearance of a temperature conditioning device in the related art.

FIG. 6 described for reference in comparison with the present invention illustrates an appearance of a temperature conditioning device 90 in the related art. In the temperature conditioning device 90 in the related art, a Peltier device 903, a temperature conditioning member 901, and a support member 902 for heating and cooling the sample 7 are attached, similarly to the configuration of the present invention. A heat conducting member 904 and a heat sink 905 are attached to a bottom face of the support member 902.

However, in this configuration, since heat is transferred via the support member 902, the thermal conductivity of the support member 902 itself also needs to be sufficiently high. Therefore, an Al alloy A 6063 (thermal conductivity 220 [$Wm^{-1}K^{-1}$], linear expansion coefficient $23 \times 10^{-6}$ [$K^{-1}$]) or the like is generally used for both the support member 902 and the heat conducting member 904.

In the configuration of the related art in FIG. 6, all the heat generated on the heat dissipation side of the Peltier device 103 is transferred to the support member 902, and the temperature rises accordingly. In addition, since the support member 902 is made of the Al alloy as described above, the linear expansion coefficient is low and the thermal deformation amount is large as compared with the Fe—Ni 36% alloy used in the present invention. Therefore, since a distance D between the measurement point of the sample 7 and the imaging means 2A changes due to thermal deformation, there is a problem that the image is blurred at the time of imaging, and the inspection performance deteriorates.

On the other hand, in the sample analyzing apparatus 1 including the temperature adjustment mechanism 10 according to the first embodiment described above, most of the heat generation on the Peltier device heat dissipation side is propagated by the heat dissipation member when the temperature conditioning part is cooled, so that the temperature change of the support portion can be reduced, and the thermal deformation amount can be reduced.

Second Embodiment

In the second embodiment, it will be described that heat transfer to the table side is more efficiently suppressed by changing the manner of supporting the support member while basically following the configuration of the first embodiment.

Figure 7:
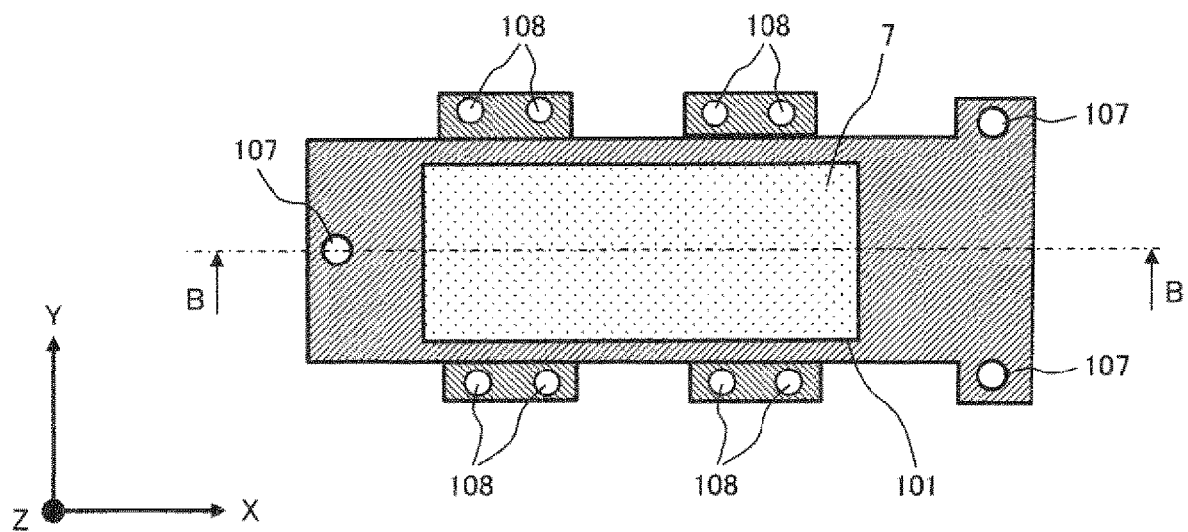
FIG. 7 is a top view of a temperature conditioning unit according to a second embodiment.
Figure 8:
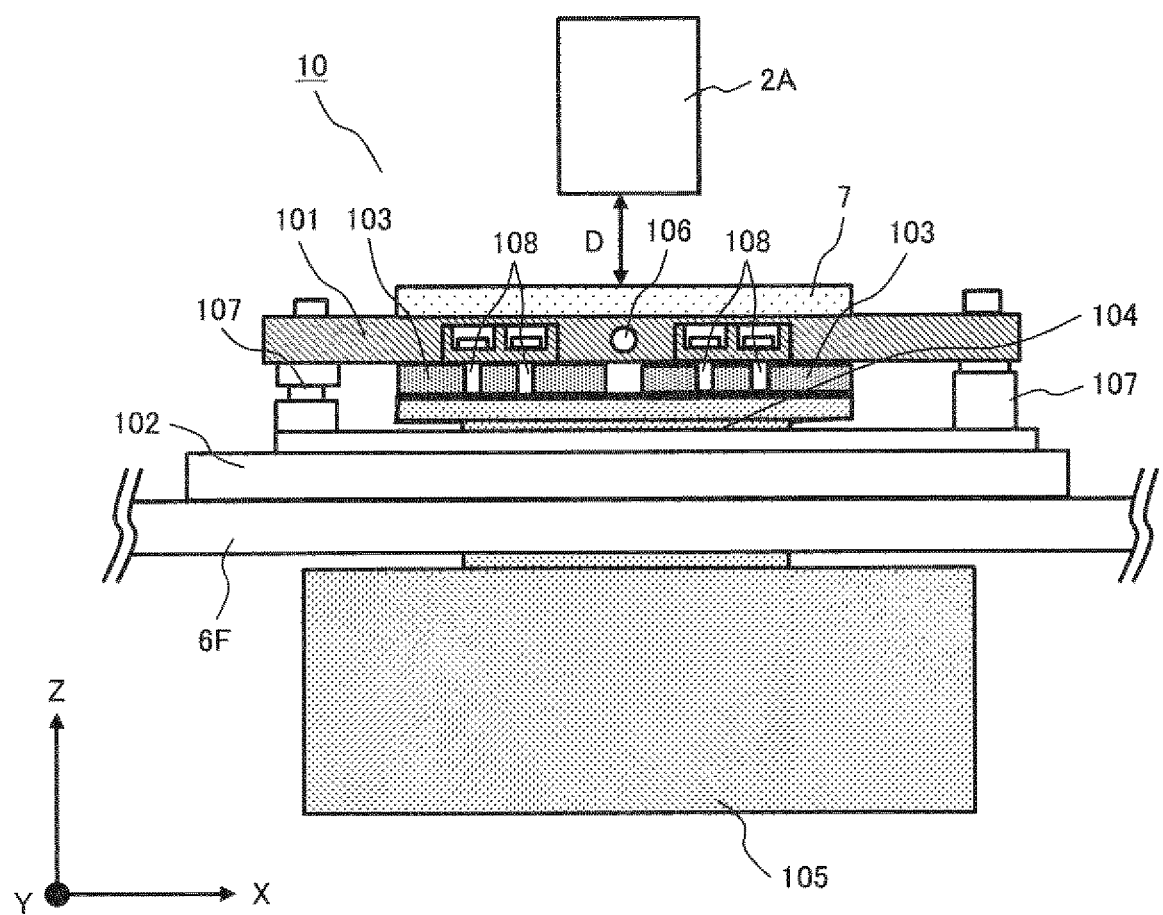
FIG. 8 is a side view of a temperature conditioning unit according to the second embodiment.
Figure 9:
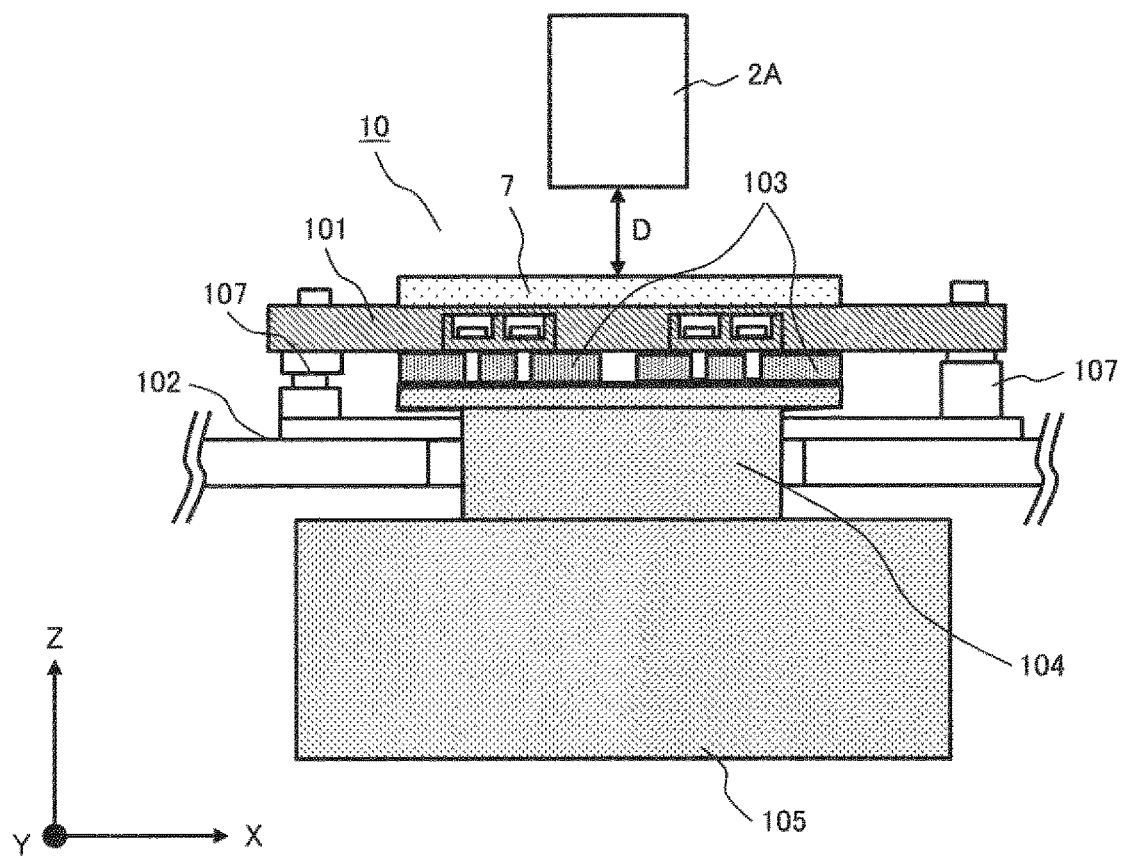
FIG. 9 is a cross-sectional view taken along line B-B of the temperature conditioning unit according to the second embodiment.

FIG. 7 is a top view of a temperature conditioning unit according to the second embodiment of the present invention, and FIG. 8 is a side view of the temperature conditioning unit 10 according to the second embodiment. FIG. 9 illustrates a cross section taken along line B-B in FIG. 7.

The temperature conditioning unit 10 in the present embodiment includes a Peltier device 103 for heating and cooling the sample 7 to be measured. The sample 7 is mounted in a state of being in contact with temperature conditioning member 101 attached to one face of the Peltier device 103.

Here, a thermistor 106 for measuring the temperature is attached to the temperature conditioning member 101. The temperature of the temperature conditioning member 101 is measured by the thermistor 106. Then, by controlling the temperature of the Peltier device 103 by current adjustment means (not illustrated), the temperature conditioning member 101 is changed to a predetermined temperature, and the sample 7 can be heated and cooled once.

The temperature conditioning member 101 is attached to an indication member 102 by an adjustment screw 107. The adjustment screw 107 is provided at three positions with respect to the temperature conditioning member 101. By changing the attachment height of the screw, it is possible to adjust the distance of the face of the sample 7 to be constant with respect to an optical observation system 2A so that the face falls within the measurement range when the stage is moved.

Furthermore, the heat conducting member 104 is provided at a position in direct contact with the Peltier device 103, and the Peltier device 103 is sandwiched and fixed between the temperature conditioning member 101 and the heat conducting member 104 by tightening a mounting screw 108.

The support member 102 has a hole in a central portion, and the heat conducting member 104 is attached so as to penetrate the hole.

The heat generated by the Peltier device is transferred to the heat sink 105 via the heat conducting member 104. The heat sink 105 is cooled by the cooling means (for example, a fan) (not illustrated). There is a gap between the heat conducting member 104 and the support member 102, and the thermal deformation of the heat conducting member 104 is not transferred to the support member 102.

Here, the heat conducting member 104 is made of a material having higher thermal conductivity than the support member 102. The support member 102 is made of a material having a linear expansion coefficient lower than that of the heat conducting member 104. Here, an iron-based alloy, for example, a Fe—Ni 36% alloy (thermal conductivity 13 [$Wm^{-1}K^{-1}$], linear expansion coefficient $1.7 \times 10^{-6}$ [$K^{-1}$]) is used for the support member 102, and an Al alloy A 6063 (thermal conductivity 210 [$Wm^{-1}K^{-1}$], linear expansion coefficient $23 \times 10^{-6}$ [$K^{-1}$]) is used for the heat conducting member.

Further, the support member 102 is fixed to the table 6F by a screw (not illustrated).

When the temperature conditioning member 101 is cooled, the temperature on the heat dissipating face side of the Peltier device 103 increases. The heat generated here is transferred to the heat sink 105 via the heat conducting member 104. Then, the heat sink 105 is cooled by cooling means (for example, a fan) (not illustrated).

Here, since the support member 102 is not in contact with the heat conducting member 104, all heat generated on the heat dissipating face of the Peltier device 103 is propagated to the heat transfer portion 104 and is not transferred to the support member 102. Therefore, the amount of heat transferred to the support member 102 is reduced, and the temperature change can be reduced, thereby reducing the thermal deformation amount.

Third Embodiment

The third embodiment relates to increasing the rigidity of a support member.

Figure 10:
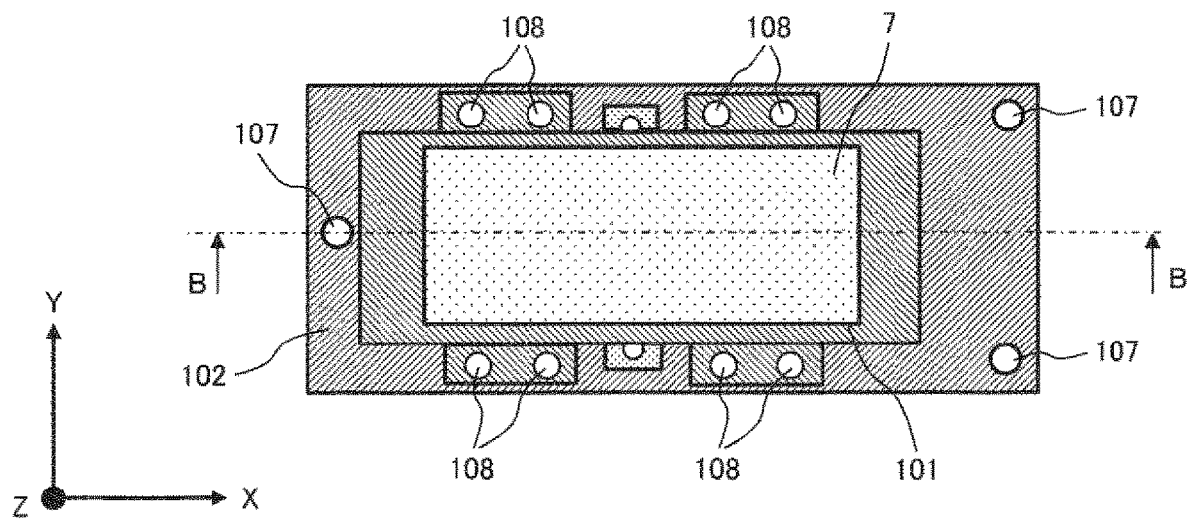
FIG. 10 is a top view of a temperature conditioning unit according to a third embodiment.
Figure 11:
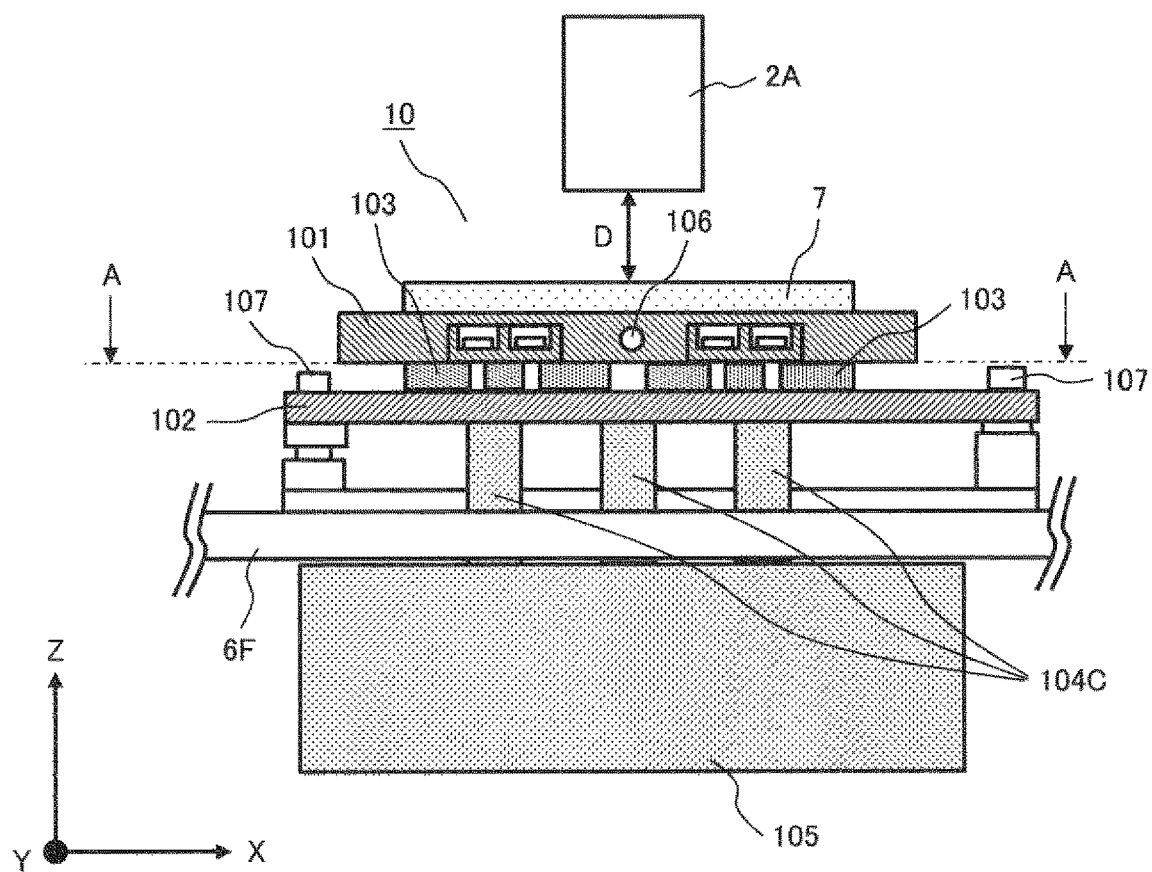
FIG. 11 is a side view of a temperature conditioning unit according to the third embodiment.
Figure 12:
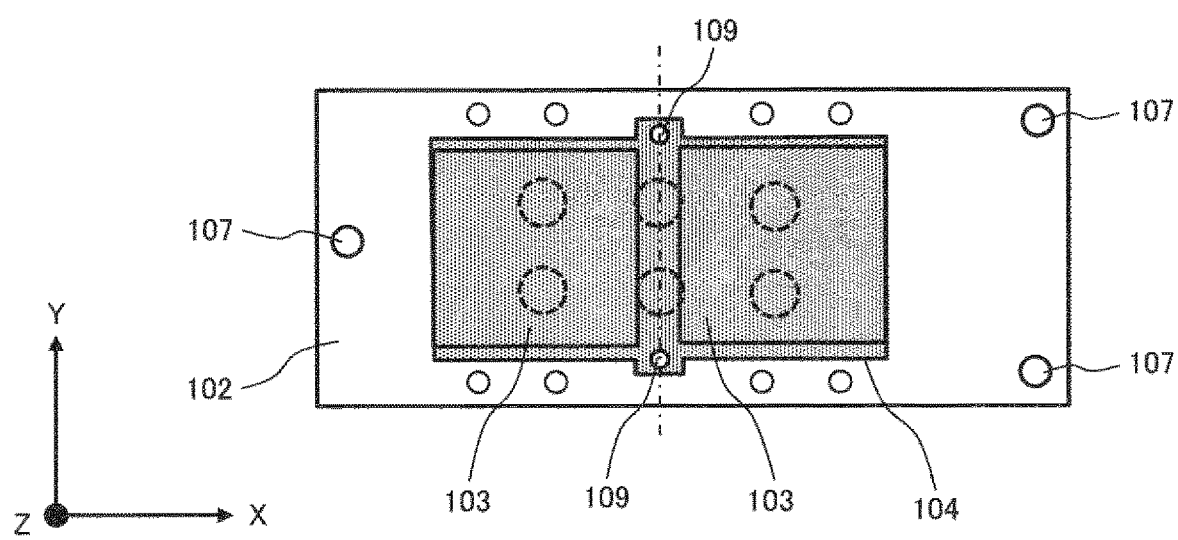
FIG. 12 is a cross section taken along line A-A of the temperature conditioning unit according to the third embodiment.
Figure 13:
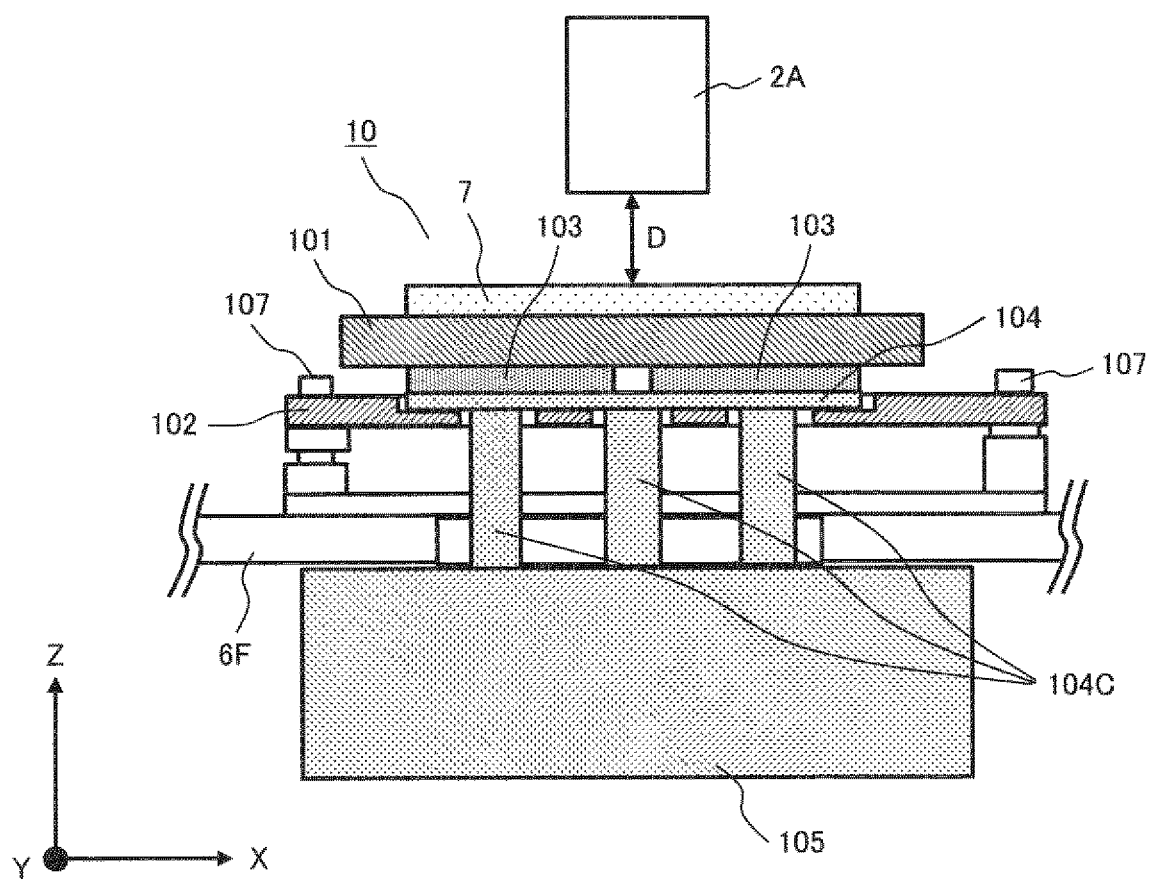
FIG. 13 is a cross-sectional view taken along line B-B of the temperature conditioning unit according to the third embodiment.

FIG. 10 is a top view of the temperature conditioning unit 10 according to the third embodiment, and FIG. 11 is a side view thereof. Here, FIG. 12 illustrates a cross section taken along line A-A in FIG. 11, and FIG. 13 illustrates a cross section taken along line B-B in FIG. 10.

The temperature conditioning unit 10 in the third embodiment includes a Peltier device 103 for heating and cooling the sample 7 to be measured. The temperature conditioning member 101 is attached to one face (temperature conditioning face side) of the Peltier device 103, and the sample 7 is fixed to the upper face thereof in a state of being in close contact with the sample 7.

Here, the temperature conditioning member 101 incorporates a thermistor 106 for measuring its own temperature. The temperature of the temperature conditioning member 101 is measured by the thermistor 106, and the temperature of the Peltier device 103 is controlled by current adjustment means (not illustrated), and thereby a predetermined temperature can be applied to the sample 7.

Further, the heat conducting member 104 is attached so as to come into contact with the lower face (heat dissipating face) side of the Peltier device 103. Further, the heat conducting member 104 has a plurality of transmission paths 104C, and a heat sink 105 is attached to an end portion thereof. The heat sink 105 is cooled by cooling means (not illustrated).

The temperature conditioning unit 10 is provided with a support member 102 that supports the temperature conditioning member 101, the Peltier device 103, and the heat conducting member 104 and adjusts the distance between the imaging means 2A and the sample 7. Here, the support member 102 fixes and supports the Peltier device 103 and the temperature conditioning member 101 by a mounting screw 108. The support member 102 is attached at three positions so as to be fixed to the table 6F by an adjustment screw 107. A face angle of the support member 102 can be changed by adjusting the attachment heights of the three screws. Then, when the table 6F is moved in the X and Y directions in the drawing at the time of imaging, the measurement position of the sample 7 and the distance D between the imaging means 2A can be adjusted so as to fall within a range in which focus deviation does not occur.

Here, the heat conducting member 104 is made of a material having higher thermal conductivity than the support member 102. The support member 102 is made of a material having a linear expansion coefficient lower than that of the heat conducting member 104. Here, an iron-based alloy, for example, a Fe—Ni 36% alloy (thermal conductivity 13 [Wm$^{-1}$K$^{-1}$], linear expansion coefficient $1.7 \times 10^{-6}$ [K$^{-1}$]) is used for the support member 102, and an Al alloy A 6063 (thermal conductivity 210 [Wm$^{-1}$K$^{-1}$], linear expansion coefficient $23 \times 10^{-6}$ [K$^{-1}$]) is used for the heat conducting member.

The effect of the third embodiment is the same as that of first embodiment and the like, and the difference is that a plurality of heat conducting members 104C are provided on the heat dissipation side of the Peltier device 103. A heat sink 105 is attached to ends of the plurality of heat conducting members 104C.

According to this configuration, by dividing into the plurality of transmission paths 104C, the size of each through-hole of the support member 102 can be reduced, and the rigidity of the support member 102 can be maintained.

REFERENCE SIGNS LIST

1 Imaging mechanism
2 Optical measurement unit
2A Imaging means
3 Base frame
4 Vibration removing part
5 X moving mechanism
6 Y moving mechanism
7 Sample
10 Temperature conditioning unit
90 Temperature conditioning unit in the related art
101 Temperature conditioning member
102 Support member
103 Peltier device
104 Heat conducting member
105 Heat sink
106 Thermistor
107 Adjustment screw
108 Mounting screw
109 Fixing screw

The invention claimed is:

1. An imaging mechanism comprising:
an optical measurement unit for optically observing a sample;
a temperature conditioning unit for heating or cooling the sample, the temperature conditioning unit being mounted on a table by means of a support member; and
a moving mechanism for moving the table in order to photograph an entire region of the sample,
wherein the temperature conditioning unit is provided with a temperature conditioning part for heating or cooling the sample, abutted on one face of a Peltier device, a heat conducting member abutted on an other face of the Peltier device, and the support member having a groove-shaped portion for holding the temperature conditioning part and the heat conducting member and fixing the temperature conditioning part and the heat conducting member on the table, and
wherein the heat conducting member is provided in the groove-shaped portion and connected to cooling means, and thermal conductivity of the support member is low relative to thermal conductivity of the heat conducting member.

2. The imaging mechanism according to claim 1,
wherein the support member is made of a material having a lower linear expansion coefficient than the heat conducting member.

3. A sample analyzing apparatus comprising:
the imaging mechanism according to claim 1.

4. An imaging mechanism comprising:
an optical measurement unit for optically observing a sample;
a temperature conditioning unit for heating or cooling the sample, the temperature conditioning unit being mounted on a table by means of a support member; and
a moving mechanism for moving the table in order to photograph an entire region of the sample,
wherein the temperature conditioning unit is provided with a temperature conditioning part for heating or cooling the sample, abutted on one face of a Peltier device, a heat conducting member abutted on an other face of the Peltier device, and the support member having a hole-shaped portion for holding the temperature conditioning part and the heat conducting member and fixing the temperature conditioning part and the heat conducting member on the table, and
wherein the heat conducting member is provided so as to pass through at least the hole-shaped portion and connected to cooling means, and thermal conductivity of the support member is low relative to thermal conductivity of the heat conducting member.

5. The imaging mechanism according to claim 4, wherein the support member is made of a material having a lower linear expansion coefficient than the heat conducting member.

6. The imaging mechanism according to claim 4, wherein the Peltier device is sandwiched and fixed between the temperature conditioning part and the heat conducting member, and the support member is connected to the temperature conditioning part and is attached without being in contact with the Peltier device and the heat conducting member.

* * * * *